United States Patent [19]

Cowpertwait et al.

[11] Patent Number: 4,667,810

[45] Date of Patent: May 26, 1987

[54] SEALS BETWEEN CONVEYORS AND HOPPERS DISCHARGING ON TO THE CONVEYORS

[75] Inventors: John Cowpertwait, Orpington; Peter J. Edwards, London, both of United Kingdom

[73] Assignee: Babcock Hydro-Pneumatic Limited, London, England

[21] Appl. No.: 792,037

[22] Filed: Oct. 28, 1985

[30] Foreign Application Priority Data

Oct. 29, 1984 [GB] United Kingdom ................. 8427323

[51] Int. Cl.⁴ ............................................. B65G 47/44
[52] U.S. Cl. .................................... 198/525; 198/836; 198/860.3
[58] Field of Search ..................... 198/525, 836, 860.5, 198/860.3, 540, 550.01, 550.2

[56] References Cited

U.S. PATENT DOCUMENTS

| | | | |
|---|---|---|---|
| 1,919,086 | 7/1933 | Andreas | 198/540 |
| 1,988,676 | 1/1935 | Andreas | 198/540 |
| 2,342,039 | 2/1944 | Davis | 198/540 |
| 3,342,355 | 9/1967 | Lasiter | 198/540 |
| 3,583,171 | 6/1971 | Flynn et al. | 198/860.5 |
| 3,878,936 | 4/1975 | Niggemyer | 198/860.5 |
| 4,204,595 | 5/1980 | Marrs | 198/836 |
| 4,252,493 | 2/1981 | Ilse | 198/540 |

FOREIGN PATENT DOCUMENTS

| | | | |
|---|---|---|---|
| 875025 | 4/1953 | Fed. Rep. of Germany | 198/540 |
| 1229435 | 9/1960 | France | 198/836 |

Primary Examiner—Joseph E. Valenza
Assistant Examiner—D. Glenn Dayoan
Attorney, Agent, or Firm—Solon B. Kemon

[57] ABSTRACT

A hopper discharging material onto an endless conveyor running in a trough positioned below the hopper is provided with a seal movable between two positions by two-position clamp. In one position the seal is effective to close the gap between the hopper and trough and in the other, the gap is exposed to provide access to the conveyor.

3 Claims, 3 Drawing Figures

Fig. 2.
Fig. 3.
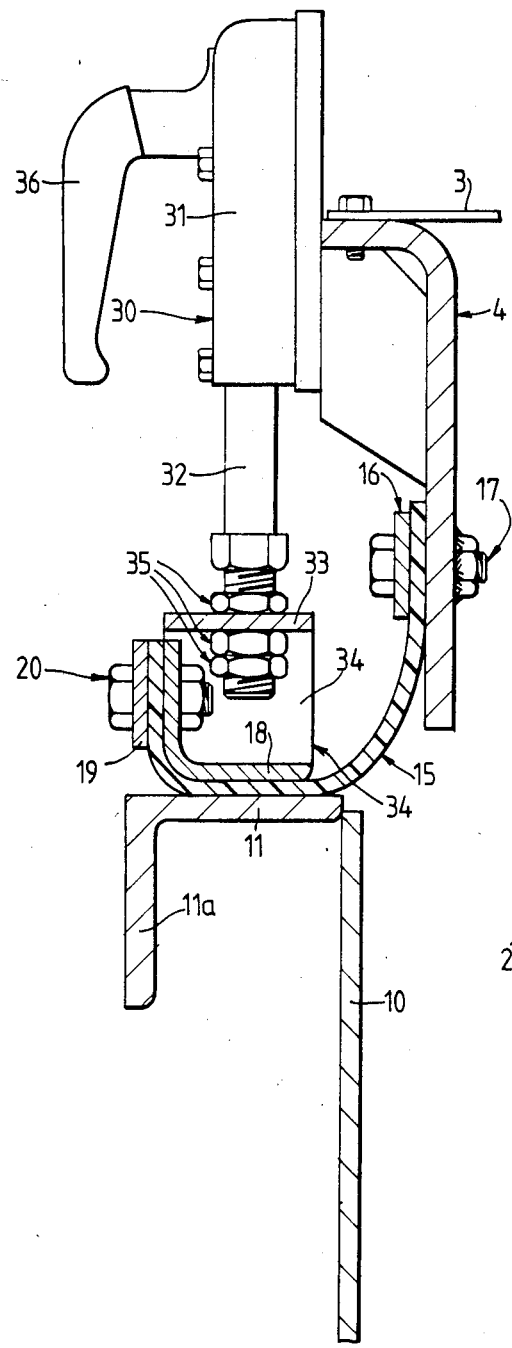
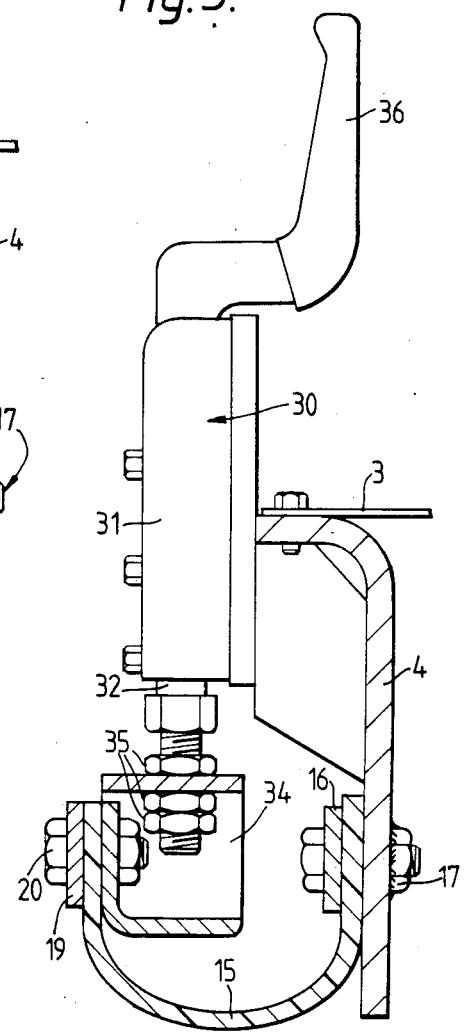
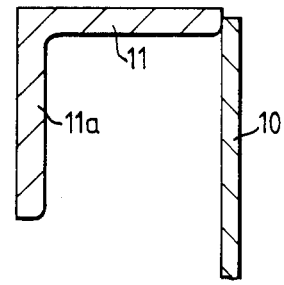

4,667,810

SEALS BETWEEN CONVEYORS AND HOPPERS DISCHARGING ON TO THE CONVEYORS

BACKGROUND OF THE INVENTION

It is common practice for a steam generator to be provided with an ash hopper that discharges onto an endless conveyor, such as a submerged scraper chain conveyor. The objectionable escape of gas and dust can be inhibited by a seal provided between the two and the present invention is concerned to provide means by which a gap between a hopper outlet and a conveyor below it may be closed.

According to the present invention, there is provided an apparatus comprising an ash hopper and an endless conveyor extending below the hopper and running beside a wall that bounds the path of the conveyor, means closing a gap between the wall and a strip fixed to, or incorporated in, the hopper and extending lengthwise of the wall, the means including a flexible impermeable band extending along the wall and fixed along one edge to the wall or the strip, a beam that is fixed along the other edge of the band, and clamps acting on the beam by operation of which the beam may be withdrawn from, and held in engagement, with the strip or the wall.

BRIEF DESCRIPTION OF THE DRAWINGS

By way of example, an embodiment of the invention will now be described with reference to the accompanying drawings in which

FIG. 2 shows, in side view on the line II—II of FIG. 1 and on a larger scale, one of the clamps that are incorporated in the apparatus shown in FIG. 1, in its lowered, operative, position; and FIG. 3 shows the clamp shown in FIG. 2 in its raised, inoperative, position.

DETAILED DESCRIPTION OF THE DRAWINGS

Figure 1:
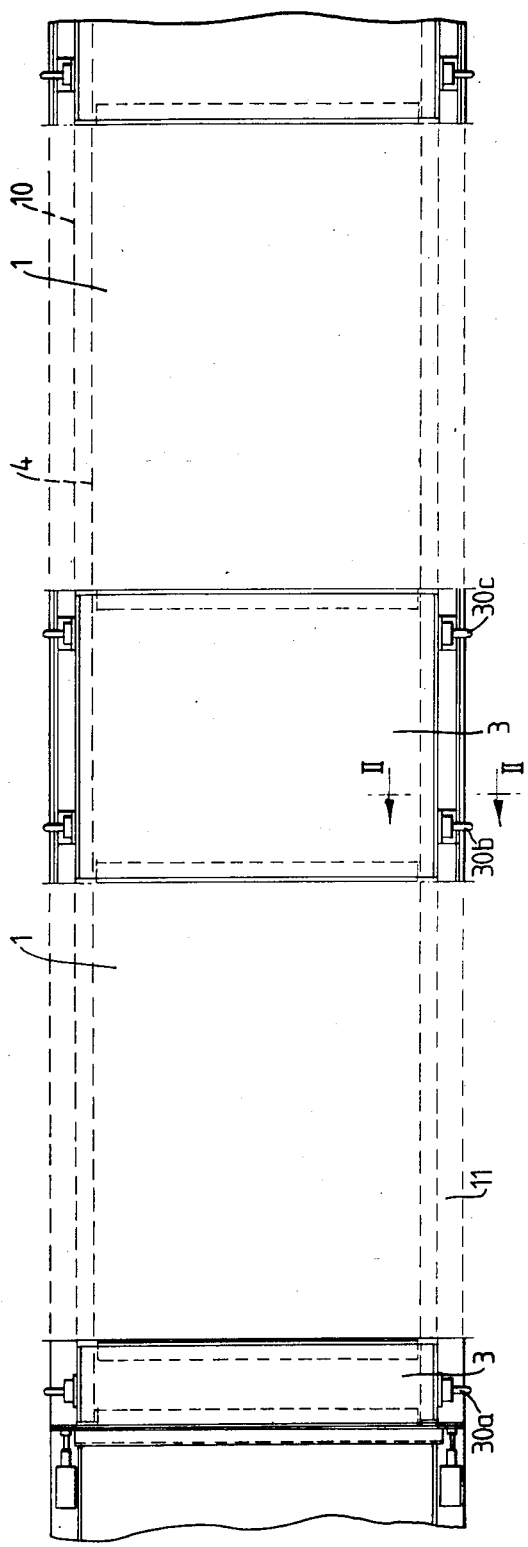
FIG. 1 shows part of a plan view of a row of hoppers aligned above a submerged scraper chain conveyor.

As indicated in FIG. 1, hoppers 1 (four in this particular embodiment) are arranged equally spaced in a row above a submerged scraper chain conveyor.

The spaces between the hoppers 1 are closed by plates 3 which at their ends are sealed to the outlets of the hoppers 1. At their sides, the plates 3 are connected to strips 4 which also make a closed connection with the side edges of the hopper outlets.

One of the parallel longitudinal side walls of the trough in which the conveyor operates is indicated at 10. The upper edge of each wall 10 incorporates an angle beam. Horizontal face 11 of the angle beam extends outwardly and the vertical face 11a projects downwardly, remote from the upright part of the wall 10. The angle beam provides strength and rigidity to the wall.

A band of a flexible, material 15 is connected at its upper edge along the length of the strip 4, being gripped between the strip 4 and a backing strip 16 by bolts 17 passing through both strips and the band 15. The band 15 may be formed of non-porous, heat-resistant, reinforced rubber.

Along its other edge, the band 15 is connected to an angle beam 18, the connection being similarly effected by use of a backing strip 19 and bolts 20. Between its edges, the band 15 passes below the beam. The beam 18 can be raised and lowered, as will be described, and when the beam 18 is in its lowermost position (as shown in FIG. 2), part of the band 15 between its edges is gripped between the strip represented by the flange 11 and the beam 18. It thus forms a seal between the wall 10 and the strip 4.

The band 15 may be moved between the positions in which it is shown in FIGS. 2 and 3 by means of the clamps 30. Each includes a housing 31 in which is reciprocable a stem 32. The stem is connected at its upper end to an over-centre handle 36 of known kind that, when it has moved into the position in which it is shown in FIG. 2, from the position in which it is shown in FIG. 3, exerts a positive downward pressure. This pressure is exerted on the beam 18 through the beam 33, which is connected to the beam 18 through cross-fillets 34.

To accommodate minor variations in the level of the face 11, the height along the stem 32 at which the beam is connected to it may be varied by adjustment of the nuts 35 on the threaded lower end of the stem 32.

As is apparent from FIG. 1, two clamps 30 are associated with each hopper 1. The clamps 30 associated with any hopper lie one to each side of the hopper and they would be operated by two operatives. Thus, referring to FIG. 1, clamps 30a and 30b would be operated together. This would leave a small difference in the height of the band 15 at 30b and 30c and to accommodate this, there would be a break in the beams 18 and 32. The flexibility of the band 15 would allow it to be continuous, but the band 15 itself could also be broken there.

In the embodiments described, the band 15 moves towards and away from the wall 10. In modifications, it is envisaged that the strip 4 could be so located that the band moves towards and away from the hopper.

What is claimed is:

1. In an apparatus having an open bottom ash hopper positioned vertically above and spaced from the upper end of an open top trough housing an endless conveyor, means for opening or closing the vertical gap between the hopper and the trough comprising:

a horizontal beam mounted for vertical reciprocating movement in the gap between said hopper and trough;

an elongated dust impervious flexible band extending horizontally the length of the hopper and trough with one longitudinal edge attached to said movable beam and the other edge fixedly supported from said hopper; and two-position clamp means for urging said beam and band into engagement with an upper surface of said trough in one position to effect a dust seal between the hopper and trough and to retract said beam in the other position to expose the gap between said hopper and trough.

2. The combination defined by claim 1 in which when said beam is held in said one position, said band is gripped between said beam and a surface of said trough.

3. The combination defined by claim 1 in which said clamp means is such that its operation moves the beam to a rest position away from said one position and means is provided by which the separation between positions is adjustable.

* * * * *